(No Model.)

F. SPLITTSTOSER.
AUTOMATIC LOCKING HOOK.

No. 396,775. Patented Jan. 29, 1889.

Witnesses.
C. N. Keeney.
Anna Faust.

Inventor.
Ferdinand Splittstoser
By Erwin Benedict
Attorneys.

United States Patent Office.

FERDINAND SPLITTSTOSER, OF NORTH BRANCH, MINNESOTA.

AUTOMATIC LOCKING-HOOK.

SPECIFICATION forming part of Letters Patent No. 396,775, dated January 29, 1889.

Application filed September 12, 1888. Serial No. 285,211. (No model.)

*To all whom it may concern:*

Be it known that I, FERDINAND SPLITTSTOSER, of North Branch, in the county of Isanti and State of Minnesota, have invented a new and useful Automatic Locking-Hook; and I do hereby declare the following to be a full, clear, and exact description of said invention, reference being had to the accompanying drawings, and to the letters or figures of reference marked thereon, which form a part of this specification.

Figure 1:
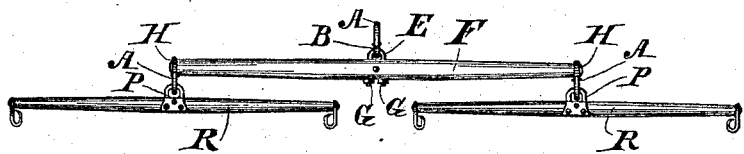
Figure 2:
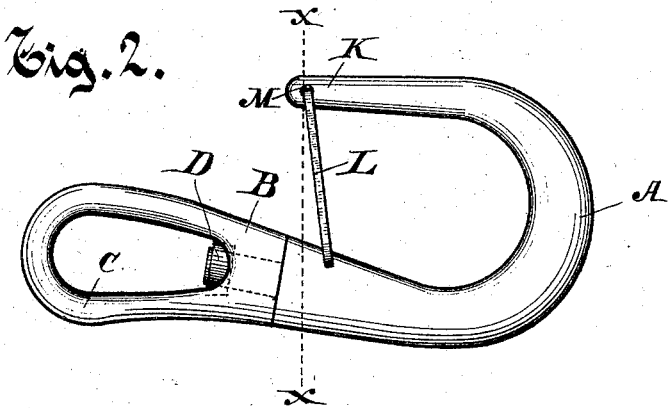
Figure 3:
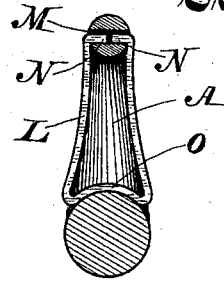

In the drawings, Figure 1 shows a set of double whiffletrees with which my newly-invented device is shown, and illustrating where and how it may be used. Fig. 2 shows my newly-invented device complete. Fig. 3 is a vertical transverse section of my device as shown in Fig. 2 on line X X thereof.

The hook A has its shank B swiveled in the link or eye C, the shank being inserted in an aperture in the end of the eye C and secured therein by a washer, D, placed about the end of the shank B, and the shank B is then riveted or headed down on the washer, thereby securing it in the eye C, but loosely, so that the hook may turn about on its axis in the eye, thereby forming a swivel. This link or eye C is adapted to receive a staple or clevis, E, which in use with whiffletrees is inserted through the whiffletree F and secured therein by nuts G G turning thereon, or may be secured on the whiffletree by an eye, as shown at H. In the free end K of the hook A a tongue or latch, L, is pivoted, which tongue or latch is adapted to allow the hook to receive therein the link or ring, or whatever else it is adapted to hold, and then to fall behind the ring and retain it permanently in engagement with the hook A. For receiving and holding this latch L a transverse aperture, M, is made through the free end K of the hook, and a loop-latch is formed of a single piece of wire or strip of metal, the two ends of which wire or strip of metal are brought near together at the upper end of the latch, forming the tangs N N, which enter the aperture M and support the latch in position, and on which tangs the latch is pivoted in the end of the hook. The lower end of the latch O is curved or formed to fit upon the inner surface of the back part of the hook and extends down on the sides of the hook, as shown in Fig. 3, so as to have a bearing on both sides of this part of the hook, and thereby to prevent its swinging laterally when in contact with the back of the hook. This latch is of such length and so constructed that it is free to swing forward against the inside of the free end K of the hook; but when it swings backwardly its free end engages with the rear part of the hook, as shown in Fig. 2, so that it cannot be forced outwardly, and thereby it locks and holds whatever is within the bend of the hook in engagement with the hook, and will not allow it to escape therefrom.

It will be understood that to engage this hook with a ring or any other article capable of entering the space within the hook it is only necessary to swing the latch L forward against the free end K of the hook and then slip the ring onto the hook, after which the latch L will by gravity, if the hook is in the position shown in Fig. 2, fall back in the position there shown, and will thus lock the ring in engagement with the hook, as stated. The eye-pieces or clevises P P on each of the single whiffletrees R R are thus engaged and locked in these hooks, as shown at H H.

What I claim as new, and desire to secure by Letters Patent, is—

An automatic locking-hook consisting of the hook A and the latch L, which latch is constructed of a single piece of looped wire having its two ends brought near together and pivoted in the free end of the hook, the outer or looped end of the latch being formed and adapted to fit upon and engage with the rear or opposite side of the hook, extending down on the sides thereof so as to have a bearing on both sides of this part of the hook to prevent its swinging laterally, substantially as described.

In testimony whereof I affix my signature in presence of two witnesses.

FERDINAND SPLITTSTOSER.

Witnesses:
J. H. GATES,
HERMANN STEINBRING.